United States Patent [19]

Cassidy et al.

[11] Patent Number: 5,260,346

[45] Date of Patent: Nov. 9, 1993

[54] REACTION SYSTEM FOR PREPARING POLYURETHANE/POLYUREA

[75] Inventors: Edward F. Cassidy, Chiny; Eric Huygens, Heverlee; Jan W. Leenslag, Tremelo, all of Belgium

[73] Assignee: Imperial Chemical Industries PLC, Millbank, England

[21] Appl. No.: 979,943

[22] Filed: Nov. 23, 1992

[30] Foreign Application Priority Data

Dec. 5, 1991 [GB] United Kingdom ............... 9125918

[51] Int. Cl.$^5$ .............................................. C08G 18/14
[52] U.S. Cl. ...................................... 521/159; 528/60; 528/64
[58] Field of Search .................. 528/60, 64; 521/159

[56] References Cited

U.S. PATENT DOCUMENTS

| | | | |
|---|---|---|---|
| 4,297,444 | 10/1981 | Gilbert et al. | 521/160 |
| 4,298,701 | 11/1981 | Meyborg et al. | 521/51 |
| 4,448,938 | 5/1984 | Brayninaks et al. | 525/457 |
| 4,519,965 | 5/1985 | Taylor et al. | 264/51 |
| 4,585,803 | 4/1986 | Nelson et al. | 521/105 |
| 4,689,356 | 8/1987 | Peffly et al. | 521/159 |
| 4,764,537 | 8/1988 | Horn et al. | 521/51 |
| 4,866,103 | 9/1989 | Cassidy et al. | 521/159 |
| 4,876,019 | 10/1989 | Meyer et al. | 252/32.5 |
| 4,906,674 | 3/1990 | Cassidy et al. | 521/159 |
| 4,977,195 | 12/1990 | Gillis | 521/155 |
| 5,055,134 | 10/1991 | Cassidy et al. | 106/38.22 |
| 5,081,211 | 1/1992 | Cassidy et al. | 528/67 |
| 5,114,480 | 5/1992 | Cassidy et al. | 106/38.24 |

FOREIGN PATENT DOCUMENTS

| | | |
|---|---|---|
| 0312365 | 4/1989 | European Pat. Off. |
| 355000 | 2/1990 | European Pat. Off. |
| 393903 | 10/1990 | European Pat. Off. |
| 0442084 | 8/1991 | European Pat. Off. |
| 91/12286 | 8/1991 | PCT Int'l Appl. |

OTHER PUBLICATIONS

Polyurethanes World Congress 1991, Sep. 24-26, 1991, *One Shot and Prepolymer Systems in the RIM-Process*, Meiners, H. J., Boden, H. and Braun, H. J.

*Primary Examiner*—Maurice J. Welsh

[57] ABSTRACT

Reaction system for preparing elastomers according to the RIM process, the system comprising an allophanate modified polyisocyanate, a polyol and an aromatic polyamine chain extender. No IMR is necessary.

18 Claims, No Drawings

REACTION SYSTEM FOR PREPARING POLYURETHANE/POLYUREA

The present invention is concerned with a reaction system for preparing polyurethane/polyurea elastomeric products, especially according to the reaction injection moulding (RIM) process.

Such reaction systems have been extensively described in the prior art.

In EP 355000 a reaction system has been disclosed wherein at least 90% of the polyether or polyester polyol has been pre-reacted with the polyisocyanate; in comparative examples it is shown that when less than 90% of the polyol is pre-reacted with the polyisocyanate inferior moulded objects are obtained.

EP 225640 is disclosing the use of quasi prepolymers comprising at least ⅔ of the total amount of polyol used together with a chain extender mixture to prepare mouldings.

U.S. Pat. No. 4,297,444 is disclosing the use of quasi-prepolymers wherein at least 30% of the high molecular weight polyol is pre-reacted and subsequently used together with a polyol chain extender for preparing mouldings.

Surprisingly it has been found that when a special quasi- or semi-prepolymer is used, elastomeric moulded objects may be obtained having excellent properties although the relative amount of polyol used in the quasi- or semi-prepolymer is less than 90%.

Therefore the present invention is concerned with a reaction system comprising 1) a polyisocyanate composition comprising an allophanate modified polyisocyanate which is the reaction product of a polyol having an average nominal hydroxyl functionality of from 2 to 6, preferably 2.5–3.5 and most preferably 3 and an average hydroxyl equivalent weight of at least 500, preferably 500–5000 and more preferably 1000–3000 with at least 2 equivalents, per hydroxyl equivalent, of an organic polyisocyanate, the allophanate modified polyisocyanate comprising urethane and allophanate groups in a ratio of at most 4:1, preferably at most 1:1 and most preferably at most 1:4; the polyisocyanate composition having an NCO-value of 12 to 21 and preferably 15 to 18% by weight;

2) a polyol having a nominal average hydroxyl functionality of from 2 to 6 and preferably of from 2.5 to 3.5 and most preferably of 3 and an average hydroxyl equivalent weight of at least 500; preferably 500–5000 and more preferably 1000–3000; and 3) an aromatic polyamine having a molecular weight of 122–400 and at least at one of the places ortho to one of the amines a lower alkyl substituent; the amount of hydroxyl equivalents in component 1 being 40–85%, preferably 45–80%, calculated on the total amount of hydroxyl equivalents used in component 1 and 2 and the amount of component 2 being 35–90 parts by weight (pbw) and the amount of component 3 being 10–65 pbw both calculated per 100 pbw of component 2 and 3.

Further the invention is concerned with a process for preparing a polyurethane/polyurea, especially by the reaction injection moulding process, by reacting the above components. Further the invention is concerned with moulded objects obtainable from the above reaction system and with self-releasable moulded objects comprising urea, urethane and allophanate groups and not comprising an internal mould release agent.

The above allophanate modified polyisocyanate has been described in EP 312 365.

Many publications have been made in the past wherein the use of polyether polyamines, polyimines and enamine containing compounds having a functionality of 2–6 and an average equivalent weight of at least 500, has been recommended in order to prepare good quality elastomeric polyurethane/polyurea or polyurea moulded products. However, surprisingly, such compounds do not need to be present in the reaction systems according to the present invention and, indeed, preferably are absent.

Likewise, it has been recommended in many publications to use internal mould release agents like zinc stearate for preparing polyurethane/polyurea and polyurea mouldings. Surprisingly, it has been found that such internal mould release agents do not need to be present and, indeed, preferably are absent. In particular the absence of zinc stearate provides for an additional advantage since products made from such systems are suitable for on-line painting while products made from systems comprising zinc stearate require special treatment before even partial on-line painting can be applied successfully. An internal mould release agent in this respect is a chemical which is known to provide mould release and which is combined with one of the reactants prior to reaction.

Further no other chain extenders, like polyols, polyimines, polyether polyamines and enamine containing compounds having an average equivalent weight of less than 500, than the described aromatic polyamines need to be present and, indeed, preferably are absent.

The elastomeric objects obtained exhibit excellent physical properties, the reaction system can be easily used on conventional RIM machines and the reaction system is self-releasable which means that without internal mould release agents like zinc stearate, several consecutive releases may be obtained. More than 100 releases have been observed using an external mould release agent in a conventional way, i.e. the same way as it is normally used when an internal mould release agent is present.

Organic polyisocyanates which may be used in the preparation of the polyisocyanate compositions of the invention include aliphatic, cycloaliphatic and araliphatic polyisocyanates, for example hexamethylene diisocyanate, isophorone diisocyanate, cyclohexane-1,4-diisocyanate, dicyclo-hexylmethane-4,4-diisocyanate and p-xylylene diisocyanate.

The preferred polyisocyanates, however, are the aromatic polyisocyanates, for example phenylene diisocyanates, tolylene diisocyanates, 1,5-naphthylene diisocyanate and especially the available MDI based polyisocyanates like MDI isomers, that is to say 4,4'-diphenylmethane diisocyanate, 2,4'-diphenylmethane diisocyanate and mixtures thereof and polymeric MDI. Whilst diisocyanates are the preferred polyisocyanates for use in the preparation of the polyisocyanate compositions, mixtures of diisocyanates with minor proportions of higher functionality polyisocyanates may be used if desired. Thus, MDI variants such as uretonimine-modified MDI may be used.

Suitable polyols for use in component 1 and 2 and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures. Polyesters obtained by the polymerisation of lactones, for example caprolactone, in conjunction with a polyol, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

The most preferred polyols are the polyether polyols. The polyols used in component 1 and component 2 of the reaction system according to the present invention may be the same or different. Mixtures of polyols may be used as well.

The weight ratio of the polyol used in component 2 and component 1 preferably is 0.25-3:1 and more preferably 0.5-2.5:1.

In preparing the polyisocyanate compositions (component 1), the polyisocyanate and the polyol may be reacted together using conditions that have been fully described in the prior art for the production of urethane prepolymers. Thus, one or more polyisocyanates may be reacted with one or more polyols under substantially anhydrous conditions at temperatures between 50° and 110° C., optionally in the presence of catalysts, until the formation of urethane groups by reaction between the isocyanate groups and the hydroxyl groups is substantially complete. Reaction between the urethane groups and the excess of polyisocyanate is then allowed to take place at temperatures between 50° and 110° C. so that at least 20%, preferably 50%, more preferably 80% and optionally up to 100% of the initially formed urethane groups are converted to allophanate groups. The conversion of urethane groups to allophanate groups may be assisted by catalysis. Suitable catalysts are known in the polyurethane art and include tin compounds such as dibutyltin dilaurate and sulphonic acids.

It is preferable to avoid those catalysts which under the conditions of prepolymer formation, promote competing isocyanate reactions such as trimerisation, a suitable catalyst for this purpose is zinc acetylacetonate; see Polyurethane Handbook, 1985, page 81 by Dr. G. Oertel. The exact conditions necessary to obtain the required amount of allophanate formation can be determined easily by those skilled in the art. Such conditions depend, amongst others, on the catalyst, time and temperature.

In preparing the polyisocyanate compositions, the polyisocyanate and the polyol are suitably reacted in such proportion that the initial NCO/OH ratio is at least 2:1, preferably greater than 5:1.

One convenient method of preparing the compositions involves adding the polyol gradually to the total amount of organic polyisocyanate so as to minimise chain extension.

After the allophanate modified polyisocyanate has been prepared further polyisocyanate may be added. For this the polyisocyanates mentioned before may used.

Aromatic polyamines useful as chain extenders in the reaction systems of the invention particularly include diamines, especially those selected from 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 3,3'-dimethyl-5,5'-diethyl-4,4'-diaminodiphenylmethane, 3,3'5,5'-tetraisopropyl-4,4'-diaminodiphenylmethane and the like and mixtures thereof.

The reaction systems of the present invention may further contain other conventional ingredients of such systems such as catalysts, surfactants, blowing agents, fillers (which may be reinforcements), plasticizers and fire retardants.

Catalysts are not always required for preparing polyurethane/polyurea products by RIM from the reaction system according to the present invention. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, dibutyltin (bismaleate) ester or mixtures thereof.

Tertiary amine catalysts include trialkylamines which include, for example, triethylamine; heterocyclic amines such as N-alkylmorpholines which include, for example, N-methylmorpholine, N-ethylmorpholine and 1,4-dimethylpiperazine; 2,2'-bis(dimethylamino)diethyl ether; triethylenediamine; aliphatic polyamines such as N,N, N',N'-tetramethyl-1,3-butanediamine or alkanolamines such as N-methyl diethanolamine. The amount of catalyst used will generally be less than 5 percent by weight of the total reactants, preferably less than 1%. Combinations of tertiary amine and organotin catalysts are frequently used in the art.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than 5 percent by weight of the total reactants.

Suitable blowing agents include, for example, dissolved or dispersed gases such as air, $CO_2$, $N_2O$, or nitrogen, and low boiling halogenated hydrocarbons such as methylene chloride and trichloromonofluoromethane. The amount of blowing agent used is preferably less than 4 percent by weight of the total reactants.

Suitable fillers include fibreglass reinforcement fibres, particularly those having lengths of from 1/16 inch (0.16 cm) to ½ inch (1.27 cm) and milled glass fibres having a length of 1/16 inch (0.16 cm), ⅛ inch (0.32 cm) or ¼ inch (0.64 cm) and the like. Shorter fibres are always preferred for ease of processing when they are incorporated as part of the component streams. Other particularly suitable fillers are mica, fumed silica, flake glass, Wollastonite, calcium carbonate, carbon black, and the like.

The products of the present invention can be shaped into useful articles such as automobile fascias or panels, by the reaction injection moulding (RIM) process, which is performed in a RIM machine. Conventionally the ingredients are reacted as "A" and "B" components, the "A" component being the polyisocyanate and the "B" component comprising the isocyanate-reactive ingredients together with the other conventional ingredients, like the catalysts and the surfactant. The term "reaction system" is defined as a system wherein the polyisocyanate composition is kept in a container separate from the isocyanate-reactive ingredients.

RIM machines are well known in the art and include those supplied by Admiral Equipment Corp., Akron, Ohio; by Cincinnati Milacron Corp., Cincinnati, Ohio; by Battenfeld GmbH, Meinerzhagen, West Germany and by Krauss-Maffei GmbH, West Germany.

The reagents may be blended in a suitable container and agitated at a temperature from 20° C. to 100° C.

The "A" and "B" Components are placed in separate containers, which are generally equipped with agitators, of the RIM machine wherein the temperature of the "A" and "B" Component is 20° C. to 125° C. It is preferred that the isocyanate temperature used for processing and mixing be below 50° C. The temperature of the "B" Component can be between 20° C. to 80° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from 4830-34500 kPa (700 to 5000 psi). It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio generally is from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.90 to 1.20, preferably 1.00 to 1.15; with the proviso that if a catalyst for the conversion of isocyanate to isocyanurate groups is present the index may extend up to 15.00. This ratio of equivalents is known as the index and is often expressed as a percentage.

Either or both streams may contain up to 50% by weight in solid fillers or reinforcements calculated on reactive ingredients and fillers.

The impingement mixed blend of "A"/"B" streams is injected into a mould at a velocity from 0.1 kg/sec. to 12 kg/sec., preferably 0.2 to 10 kg/sec. The mould is heated to a temperature from about 20° C. to 250° C. Suitable moulds are made of metal such as aluminium or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from 1 second to 60 seconds, preferably 20 to 40 seconds. The mould is then opened and the moulded product is removed from the mould. The moulded product may be post cured by placing the product in an oven having a temperature between 50° C. and 250° C. for a time from 10-60 minutes.

The individual components of the reaction systems are desirably stored and processed under an inert atmosphere such as dry air or nitrogen.

The invention is illustrated by the following example.

EXAMPLE

An elastomer was prepared according to the reaction injection moulding process using a Battenfeld RIM machine SHK 65 dosing unit (mould temperature 70°-75° C., output 50 kg/min, temperature of the chemicals 45° C.). Demould time was 30 seconds. The elastomer obtained was postcured for 30 minutes at 160° C. The mould was treated with an external mould release (EMR) agent (CT 8203 from Chem Trend followed by CT 8206 from Chem Trend) before the experiment started.

The following ingredients were used:

| A component | Suprasec 2380 | 150.3 pbw |
|---|---|---|
| B component | T 3275 | 56 pbw |
| | DETDA | 44 pbw |
| | T57 | 0.05 pbw |
| | Tegostab B8404 | 1 pbw |
| | HMF 7906 | 61.55 pbw |
| Index | 110 | |

The elastomer had the following physical properties (see table 1). With this reaction system more than 100 releases could be made; during this operation the mould did not need to be cleaned followed by EMR treatment; after more than 100 releases the operation was voluntarily stopped although the mould still did not need cleaning followed by EMR treatment.

TABLE 1

| Physical Properties | | | |
|---|---|---|---|
| | METHOD | VALUE | UNIT |
| Flexural Modulus | ASTM D-790 | 1350 | MPa |
| Elongation | DIN 53504 | 30 | % |
| Density | DIN 53420 | 1200 | Kg/m$^3$ |
| Heat SAG [160° C., 60 min., 150 mm O/H] | ASTM D-3769-85 | 5 | mm |
| Tensile Strength | DIN 53504 | 25 | MPa |
| Hardness | DIN 53505 | 70 | SHORE D |

SUPRASEC 2380 is a polyisocyanate composition having an NCO-value of about 16% by weight and comprising an allophanate modified polyisocyanate having a ratio of urethane groups to allophanate groups of less than 1:9 and which is the reaction product of a polyol having a functionality between 2 and 6 and a molecular weight of about 5000 and more than 2 equivalents per hydroxyl group of an MDI based polyisocyanate; SUPRASEC 2380 is commercially available from Imperial Chemical Industries PLC; SUPRASEC is a trade mark of Imperial Chemical Industries PLC.

T 3275 is a glycerol based PO polyol having 14% EO tip and an equivalent weight of about 1750; T 3275 is commercially obtainable from Imperial Chemical Industries PLC.

T57 is a catalyst obtainable from Akzo.

Tegostab B8404 is a surfactant from Goldschmidt (Tegostab is a trademark).

HMF 7906 is a hammer milled fibre from Bayer.

We claim:

1. Reaction system comprising:
   1) a polyisocyanate composition comprising an allophanate modified polyisocyanate which is the reaction product of a polyol having an average nominal hydroxyl functionality of from 2 to 6 and an average hydroxyl equivalent weight of at least 500 with at least 2 equivalents, per hydroxyl equivalent, of an organic polyisocyanate, the allophanate modified polyisocyanate comprising urethane and allophanate groups in a ratio of at most 4:1; the polyisocyanate composition having an NCO-value of 12 to 21% by weight;
   2) a polyol having an average nominal hydroxyl functionality of from 2 to 6 and an average hydroxyl equivalent weight of at least 500; and
   3) an aromatic polyamine having a molecular weight of 122–400 and at least at one of the places ortho to one of the amine groups a lower alkyl substituent; the amount of hydroxyl equivalents in component 1 being 40–85% calculated on the total amount of hydroxyl equivalents used in component 1 and 2 and the amount of component 2 being 35–90 parts by weight and the amount of component 3 being 10–65 parts by weight both calculated per 100 parts by weight of components 2 and 3.

2. Reaction system according to claim 1 characterised in that the polyol in components 1 and 2 has an average nominal hydroxyl functionality of 2.5–3.5 and an average hydroxyl equivalent weight of 500–5000.

3. Reaction system according to claim 1 characterised in that the polyol in components 1 and 2 has an average nominal hydroxyl functionality of 3 and an average hydroxyl equivalent weight of 1000–3000.

4. Reaction system according to claim 1 characterised in that the ratio of urethane to allophanate groups is at most 1:1.

5. Reaction system according to claim 1 characterised in that the ratio of urethane to allophanate groups is at most 1:4.

6. Reaction system according to claim 1 characterised in that the organic polyisocyanate is an MDI-based polyisocyanate.

7. Reaction system according to claim 1 characterised in that the NCO value of the polyisocyanate composition is 15-18% by weight.

8. Reaction system according to claim 1 characterised in that the amount of hydroxyl equivalents in component 1 is 45-80% calculated on the total amount of hydroxyl equivalents used in component 1 and 2.

9. Reaction system according to claim 1 characterised in that the weight ratio of the polyol used in component 2 and component 1 is 0.25-3:1.

10. Reaction system according to claim 1 characterised in that the weight ratio of the polyol used in component 2 and component 1 is 0.5-2.5:1.

11. Reaction system according to claim 1 characterised in that the reaction system does not comprise zinc stearate.

12. Reaction system according to claim 1 characterised in that the reaction system does not comprise an internal mould release agent.

13. Reaction system according to claim 1 characterised in that the reaction system does not comprise a chain extender selected from polyols, polyimines, polyether polyamines and enamine containing compounds having an average equivalent weight of less than 500.

14. Reaction system according to claim 1 characterised in that the reaction system does not comprise a compound selected from polyether polyamines, polyimines and enamine containing compounds having a functionality of 2-6 and an average equivalent weight of at least 500.

15. Process for preparing a polyurea/polyurethane by reacting components 1, 2 and 3 according to claim 1.

16. Process according to claim 15 characterised in that a moulded polyurea/polyurethane is prepared according to the reaction injection moulding process.

17. Molded objects prepared from the reaction system according to claim 1.

18. Self-releasable molded objects comprising polyurethane, polyurea and allophanate groups in the absence of an internal mould release agent.

* * * * *